(12) United States Patent
Kim et al.

(10) Patent No.: US 10,162,671 B2
(45) Date of Patent: Dec. 25, 2018

(54) METHOD AND APPARATUS FOR PERFORMING TASK SCHEDULING IN TERMINAL

(71) Applicant: Samsung Electronics Co., Ltd., Suwon-si, Gyeonggi-do (KR)

(72) Inventors: Rakie Kim, Suwon-si (KR); Myung-Sun Kim, Seongnam-si (KR)

(73) Assignee: Samsung Electronics Co., Ltd., Suwon-si ( * ) Notice: Subject to any disclaimer, the term of this patent is extended or adjusted under 35 U.S.C. 154(b) by 0 days.

(21) Appl. No.: 14/391,860

(22) PCT Filed: Apr. 11, 2013

(86) PCT No.: PCT/KR2013/003044
§ 371 (c)(1),
(2) Date: Oct. 10, 2014

(87) PCT Pub. No.: WO2013/154365
PCT Pub. Date: Oct. 17, 2013

(65) Prior Publication Data
US 2015/0067700 A1    Mar. 5, 2015

(30) Foreign Application Priority Data

Apr. 12, 2012 (KR) .......................... 10-2012-0037978

(51) Int. Cl.
*G06F 9/46* (2006.01)
*G06F 11/34* (2006.01)
*G06F 9/50* (2006.01)

(52) U.S. Cl.
CPC ............ *G06F 9/46* (2013.01); *G06F 11/3419* (2013.01); *G06F 9/50* (2013.01); *G06F 11/3433* (2013.01);
(Continued)

(58) Field of Classification Search
CPC .......... G06F 9/46; G06F 9/50; G06F 11/3419; G06F 11/3433; G06F 11/3466; G06F 2201/865; G06F 2209/5019
See application file for complete search history.

(56) References Cited

U.S. PATENT DOCUMENTS 8,555,281 B1 * 10/2013 van Dijk ............... G06F 9/4881
718/100
2006/0168571 A1 * 7/2006 Ghiasi .................... G06F 9/505
717/127
(Continued)

FOREIGN PATENT DOCUMENTS

KR   10-2007-0116712 A   12/2007
KR   10-2010-0018289 A    2/2010
(Continued)

*Primary Examiner* — Lewis A Bullock, Jr.
*Assistant Examiner* — Tina Huynh
(74) *Attorney, Agent, or Firm* — Jefferson IP Law, LLP (57) ABSTRACT

A method and an apparatus for performing task scheduling in a terminal are provided. The terminal includes at least two different types of cores and determines if a change in a task state has occurred in response to at least one of the two cores, If a change in a task state has occurred, the terminal determines, for said at least one core, the variation in the duration of each of a plurality of tasks being executed, predicts the duration of each of the plurality of tasks on the basis of the change in the task state using the determined variation, and performs task scheduling for said at least one core in accordance with the predicted duration.

13 Claims, 5 Drawing Sheets

(52) U.S. Cl.
CPC .... *G06F 11/3466* (2013.01); *G06F 2201/865* (2013.01); *G06F 2209/5019* (2013.01)

(56) References Cited

U.S. PATENT DOCUMENTS

| | | | | |
|---|---|---|---|---|
| 2007/0038987 | A1* | 2/2007 | Ohara | G06F 8/45 717/151 |
| 2007/0074211 | A1* | 3/2007 | Klug | G06Q 10/06 718/100 |
| 2007/0113231 | A1* | 5/2007 | Honmura | G06F 9/4881 718/100 |
| 2007/0283337 | A1 | 12/2007 | Kasahara et al. | |
| 2008/0077928 | A1* | 3/2008 | Matsuzaki | G06F 9/5044 718/104 |
| 2009/0031317 | A1* | 1/2009 | Gopalan | G06F 9/5033 718/103 |
| 2009/0254774 | A1* | 10/2009 | Chamdani | G06F 9/4881 714/2 |
| 2009/0282413 | A1* | 11/2009 | Cialini | G06F 9/4881 718/102 |
| 2009/0307699 | A1* | 12/2009 | Munshi | G06F 9/4843 718/102 |
| 2009/0328046 | A1* | 12/2009 | Proctor | G06F 9/4881 718/102 |
| 2010/0036641 | A1 | 2/2010 | Lee et al. | |
| 2010/0156888 | A1* | 6/2010 | Luk | G06T 1/20 345/418 |
| 2011/0061058 | A1* | 3/2011 | Nonogaki | G06F 9/4881 718/104 |
| 2011/0113224 | A1 | 5/2011 | Isshiki et al. | |
| 2011/0154346 | A1* | 6/2011 | Jula | G06F 9/4881 718/103 |
| 2011/0154360 | A1* | 6/2011 | Kikuchi | G06F 11/3476 718/106 |
| 2011/0161978 | A1* | 6/2011 | Jang | G06F 9/505 718/104 |
| 2011/0252251 | A1 | 10/2011 | De Cesare et al. | |
| 2012/0167101 | A1* | 6/2012 | Kandula | H04L 67/325 718/102 |
| 2012/0284728 | A1* | 11/2012 | Tchidjo Moyo | G06F 9/4881 718/103 |
| 2012/0291040 | A1* | 11/2012 | Breternitz | G06F 9/5083 718/104 |
| 2013/0024868 | A1* | 1/2013 | Jeong | G06F 9/505 718/104 |
| 2013/0074088 | A1* | 3/2013 | Purcell | G06F 9/4881 718/103 |
| 2013/0167151 | A1* | 6/2013 | Verma | G06F 9/5066 718/102 |
| 2013/0212277 | A1* | 8/2013 | Bodik | G06F 9/4887 709/226 |

FOREIGN PATENT DOCUMENTS

| | | |
|---|---|---|
| KR | 10-2011-0034653 A | 4/2011 |
| KR | 10-2011-0112791 A | 10/2011 |

* cited by examiner

METHOD AND APPARATUS FOR PERFORMING TASK SCHEDULING IN TERMINAL

CROSS-REFERENCE TO RELATED APPLICATION(S)

This application is a U.S. National Stage application under 35 U.S.C. § 371 of an International application filed on Apr. 11, 2013 and assigned application number PCT/KR2013/003044, which claimed the benefit of a Korean patent application filed on Apr. 12, 2012 in the Korean Intellectual Property Office and assigned Serial number 10-2012-0037978, the entire disclosure of which is hereby incorporated by reference.

TECHNICAL FIELD

The present disclosure relates to a method and apparatus for performing task scheduling in a terminal.

BACKGROUND

To perform efficient scheduling in a heterogeneous multi-core architecture environment, a time during which each task is executed in heterogeneous cores (e.g., a central processing unit (CPU), a graphics processing unit (GPU), a digital signal processor (DSP), and the like) needs to be considered. However, in the heterogeneous multi-core environment, there is no way to measure a duration of a task being executed except for monitoring an operation of the task. Continuously monitoring a duration of every task being executed may be considered, but in this case, excessive overhead may occur.

To address such a problem, in a heterogeneous multi-core architecture environment of the related art, a training run scheme is used to measure a duration of a task being executed. The training run scheme includes executing a program in each of, for example, a CPU and a GPU to store a task execution duration in a database, and assigning the program by referring to the task execution duration stored in the database.

However, the training run scheme merely considers a single-task environment, and thus may not be adaptively used in a multi-task environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing task scheduling in a terminal.

Another aspect of the present disclosure is to provide a method and apparatus by which a terminal effectively measures performance of multi-tasks in a heterogeneous multi-core environment.

Another aspect of the present disclosure is to provide a method and apparatus for minimizing overhead corresponding to a performance measurement in a terminal.

In accordance with an aspect of the present disclosure, a method for performing task scheduling in a terminal including at least two cores having different types is provided. The method includes determining whether a task state change has occurred corresponding to at least one of the at least two cores, determining a variation in an execution duration of each of multiple tasks being executed for the at least one core, if the task state change has occurred, predicting an execution duration for each of the multiple tasks corresponding to the task state change, by using the determined variations, and performing task scheduling with respect to the at least one core based on the predicted executed duration.

In accordance with another aspect of the present disclosure, a terminal including at least two cores having different types is provided. The terminal includes a task status monitor configured to determine whether a task state change has occurred corresponding to at least one of the at least two cores, a performance profiler configured to determine a variation in an execution duration of each of multiple tasks being executed for the at least one core, if the task state change has occurred, and to predict an execution duration for each of the multiple tasks corresponding to the task state change, by using the determined variations, and a scheduler configured to perform task scheduling with respect to the at least one core based on the predicted executed duration.

According to embodiments of the present disclosure, a terminal may effectively measure performance of multi-tasks in a heterogeneous multi-core environment. Moreover, embodiments of the present disclosure may minimize overhead corresponding to performance measurement in a terminal, and may effectively perform task scheduling through performance prediction even when a number of tasks are executed at the same time.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An embodiment of the present disclosure proposes a method and apparatus for performing task scheduling in a terminal. More specifically, an embodiment of the present disclosure proposes a method and apparatus in which a terminal including at least two cores having different types determines if a change in a task state has occurred in response to at least one of the two cores, if a task state change has occurred, determines, for the at least one core, a variation in a duration of each of a plurality of tasks being executed, predicts the execution duration of each of the plurality of tasks on the basis of the change in the task state using the determined variation, and performs task scheduling for the at least one core in accordance with the predicted task execution duration.

The at least two cores having different types may be generally referred to as heterogeneous cores. In an embodiment of the present disclosure, the heterogeneous cores include a central processing unit (CPU) and a graphics processing unit (GPU). However, the heterogeneous cores may also include other types of cores such as a digital signal processor (DSP), advanced reduced instruction set computer machine (ARM), X68, X64, and so forth.

In an embodiment of the present disclosure, the terminal may be a device, such as a cellular phone, a personal computer (PC), a tablet PC, and so forth, which has a heterogeneous multi-core architecture. In an embodiment of the present disclosure, performance measurement is described as being performed based on an operation of measuring a duration of a task being executed. In an embodiment of the present disclosure to be described below, two terms "task" and "program" may be used interchangeably.

Before undertaking a description of an embodiment of the present disclosure, a performance measuring method for task scheduling will be described.

Figure 1A:
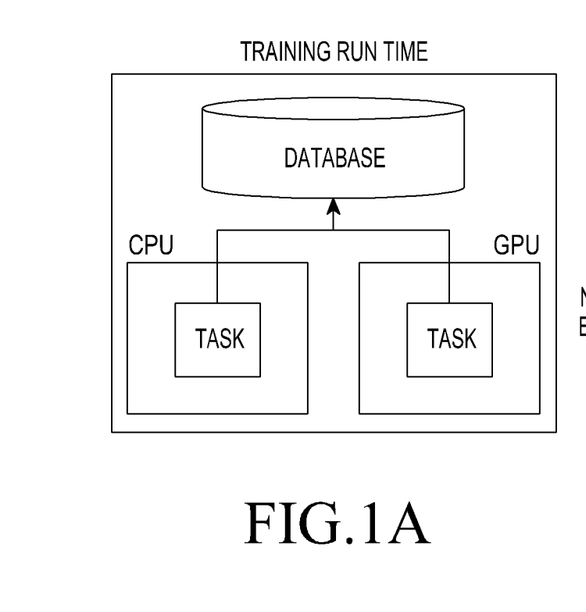
FIGS. 1A and 1B illustrate a performance measuring method for task scheduling in a terminal according to an embodiment of the present disclosure.
Figure 1B:
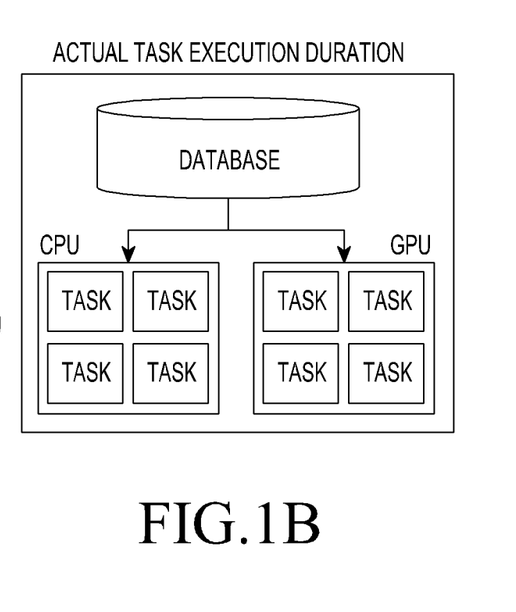

FIGS. 1A and 1B illustrate a performance measuring method for task scheduling in a terminal according to an embodiment of the present disclosure.

Generally, to perform task scheduling, a terminal measures performance of each of heterogeneous cores and assigns an additional task to a core based on the measurement result. Performance measurement is performed based on a duration of a task being executed, such that information about the task execution duration on heterogeneous cores needs to be obtained during scheduling. To this end, the terminal generally performs operations described below.

Referring to FIGS. 1A and 1B, the terminal performs a training run scheme before performing task scheduling. That is, the terminal executes a program on heterogeneous cores to store a duration of the program being executed in a database in advance. For example, as illustrated in FIG. 1A, before performing task scheduling, the terminal executes a program included in each of a CPU and a GPU and stores a duration of the task being executed corresponding to execution of the program in the database. When performing scheduling, the terminal assigns a task to each of the CPU and the GPU based on the task execution duration for each of the CPU and the GPU stored in the database.

However, as illustrated in FIG. 1B, when the assigned task is executed, multiple tasks may be executed in each of the CPU and the GPU. The task execution duration stored in the database is a time stored considering a single-task environment, such that the task execution time stored in the database does not coincide with an actual task execution time. Thus, it is not desirable to use the task execution time stored in the database in a multi-task environment illustrated in FIG. 1B.

Therefore, a method may be considered which periodically measures and stores a task execution duration of every program executed in each of the CPU and the GPU (hereinafter, will be referred to as a 'continuous profiling scheme'). However, if the continuous profiling scheme is used, as the number of programs being executed increases, overhead increases due to measurement and storage of the task execution duration. Moreover, it is difficult to sense a state change of every program, making it difficult to accurately determine a measurement period for the task execution duration.

To address the foregoing problem, an embodiment of the present disclosure proposes a method and apparatus by which task scheduling is efficiently performed, taking simultaneous execution of multiple programs in a heterogeneous multi-core architecture environment into account.

Hereinafter, referring to FIG. 2, an internal structure of a terminal according to an embodiment of the present disclosure will be described.

Figure 2:
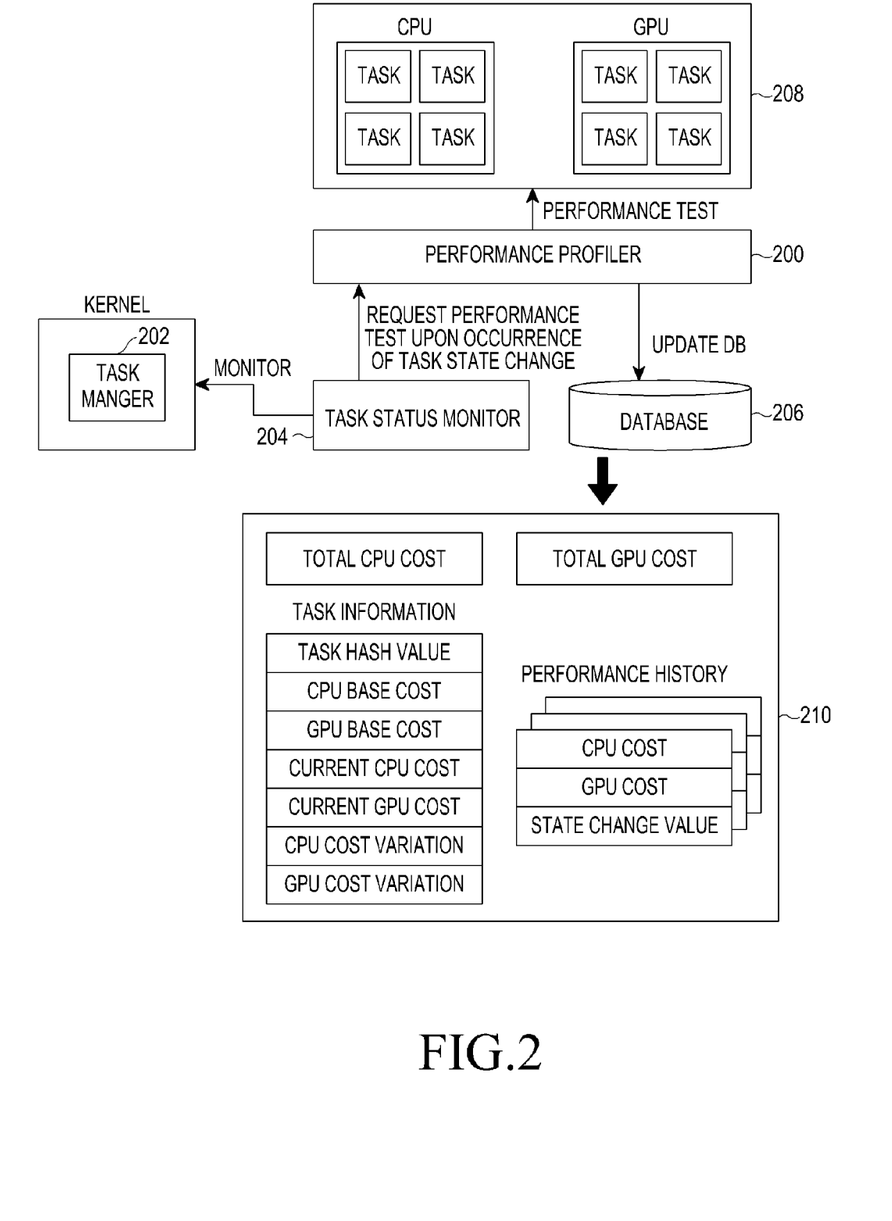
FIG. 2 is a block diagram of a terminal according to an embodiment of the present disclosure.

FIG. 2 is a block diagram of a terminal according to an embodiment of the present disclosure.

Referring to FIG. 2, the terminal may include a performance profiler 200, a task manager 202, a task status monitor 204, a database 206, and heterogeneous cores (for example, a CPU and a GPU) 208.

The performance profiler 200 measures a task execution duration of each of the CPU and the GPU and stores information about the measured task execution duration in the database 206.

The task manager 202 resides in a kernel and creates and deletes a task, and changes a task (for example, changes a value of interest).

The task status monitor 204 monitors the task manager 202 to determine a task state change, such as creation, deletion, and change of a task.

If the task status monitor 204 determines that a task state change has occurred, the database 206 stores information 210 about the state according to an instruction of the performance profiler 200. More specifically, the database 206 stores information as shown in Table 1. In Table 1, Cost indicates a task execution duration corresponding to program execution (e.g., Runtime).

TABLE 1

| No. | Information | Contents |
|---|---|---|
| 1 | Total CPU Cost | Total Cost for All Tasks of CPU |
| 2 | Total GPU Cost | Total Cost for All Tasks of GPU |
| 3 | Task Information | Indicates current state information of a task and includes the following information:<br>1) Task Hash Value: a value (e.g., a task identifier) used to determine whether tasks are the same as each other. For example, this may be a Message-Digest algorithm 5 (MD5) hash value of a task binary<br>2) CPU Base Cost: a cost when a task is executed alone in a CPU<br>3) GPU Base Cost: a cost when a task is executed alone in a GPU<br>4) Current CPU Cost: a cost when a task is executed in a CPU in a current situation<br>5) Current GPU Cost: a cost when a task is executed in a GPU in a current situation<br>6) CPU Base Variation: a variation in CPU Base Cost for Total CPU Cost, used for prediction of execution duration<br>7) GPU Base Variation: a variation in GPU Base Cost for Total GPU Cost, used for prediction of execution duration |
| 4 | Performance history | A history of CPU and GPU performance at the state check time for scheduling, including the following information:<br>1) CPU Cost: CPU Cost at the state check time<br>2) GPU Cost: GPU Cost at the state check time<br>3) State Change Value: a state change value of a CPU/GPU for forming the current state |

Although not shown in FIG. 2, the terminal may further include a scheduler that performs task scheduling according to operation results of the performance profiler 200, the task manager 202, the task status monitor 204, the database 206, and the heterogeneous cores 208.

Operations of the terminal structured as described above will be described in more detail.

Figure 3:
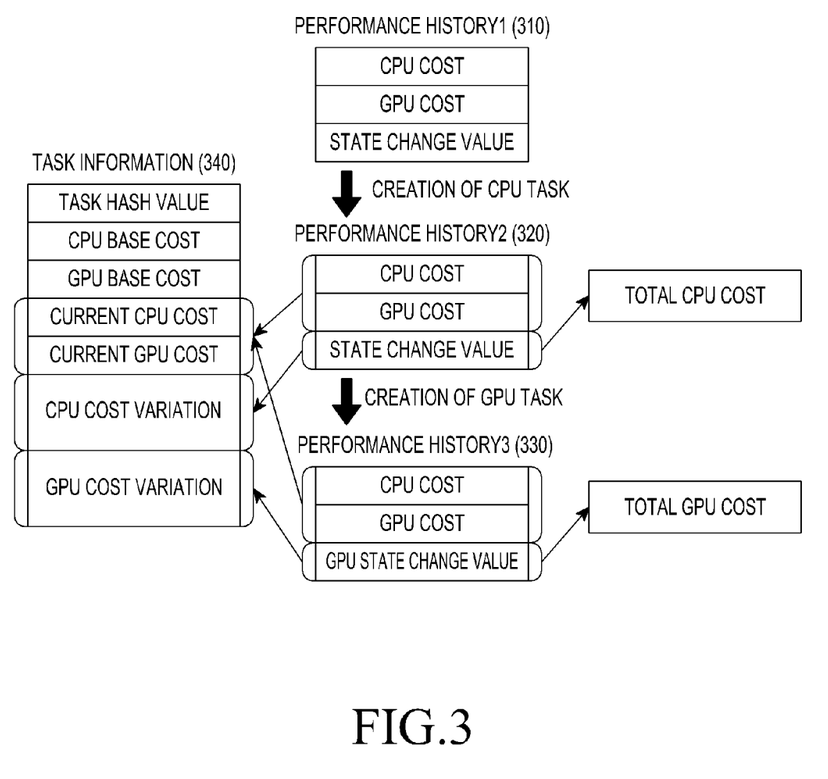
FIG. 3 illustrates a database updated corresponding to performance measurement for task scheduling in a terminal according to an embodiment of the present disclosure.

FIG. 3 illustrates a database updated corresponding to performance measurement for task scheduling in a terminal according to an embodiment of the present disclosure.

In an embodiment of the present disclosure, unlike in the general training run scheme and the continuous profiling scheme, a task state is monitored to perform performance measurement if a task state change has occurred, such that overhead corresponding to performance measurement may be reduced. Such an embodiment of the present disclosure will be described with reference to the elements illustrated in FIG. 2.

Referring to FIG. 3, the task status monitor 204 monitors the task manager 202 to determine whether a task state change, such as creation, deletion, or change of a task, has occurred. For example, if a first CPU task and a first GPU task have been created, the task status monitor 204 determines that a task state change has occurred, and requests the performance profiler 200 to perform a performance measurement.

The performance profiler 200 measures a task execution duration of each of the first CPU task and the first GPU task and stores measurement results in the database 206 as Performance history. Performance history stored in the database 206 may be, for example, Performance history 1 310 illustrated in FIG. 3.

Like in Performance history 1 310, during an initial performance measurement, task execution durations of the first CPU task and the first GPU task are stored in the database 206 as CPU Cost and GPU Cost, respectively. As a state change value, a state change initial value (for example, "0") for each of the first CPU task and the first GPU task is stored.

If it is determined that a second CPU task has been created by the task manager 202 in a state where Performance history 1 310 is stored in the database 206, the performance profiler 200 measures a task execution duration of each of the first CPU task and the second CPU task. The performance profiler 200 updates CPU Cost for the first CPU task, which is included in Performance history 1 310, with the measured execution duration of the first CPU task. The performance profiler 200 also stores a difference between updated CPU Cost and CPU Base Cost as a CPU state change value. That is, the performance profiler 200 stores, as the CPU state change value, a difference between Cost corresponding to when the first CPU task is executed alone in the CPU and Cost corresponding to when the first CPU task is executed simultaneously with the second CPU task. Performance history corresponding to the foregoing operations may be, for example, Performance history 2 320 illustrated in FIG. 3.

Herein, there is no change in a GPU task (that is, there is no creation of a new GPU task or no deletion or change of the first GPU task), such that GPU Cost and GPU state change value are maintained the same as in Performance history 1 310.

In an embodiment of the present disclosure, Performance history is created for each task and thus Performance history for the second CPU task is newly created. Consequently, once Performance history for the first CPU is updated and Performance history for the second CPU task is created, the performance profiler 200 sets a total Cost for all CPU tasks (that is, Total CPU Cost).

If a second GPU task is created by the task manager 202 in a state where Performance history 2 320 is stored in the database 206, the performance profiler 200 measures a task execution duration of each of the first GPU task and the second GPU task. The performance profiler 200 updates GPU Cost of the first GPU task, which is included in Performance history 2 320, with the measured task execution duration of the first GPU task. The performance profiler 200 also stores a difference between updated GPU Cost and GPU Base Cost as a GPU state change value. That is, the performance profiler 200 stores, as the GPU state change value, a difference between Cost corresponding to when the first GPU task is executed alone in the GPU and Cost corresponding to when the first GPU task is executed simultaneously with the second GPU task in the GPU. Performance history corresponding to the foregoing operations may be, for example, Performance history 3 330 illustrated in FIG. 3.

Herein, there is no change in a CPU task (that is, there is no creation of a new CPU task or deletion or change of the first and second CPU tasks), such that CPU Cost and CPU state change value for the first CPU task are maintained the same as in Performance history 2 320. Performance history and Total CPU Cost for the second CPU task are also maintained the same as original values.

In an embodiment of the present disclosure, Performance history is created for each task, such that Performance history for the second GPU task is newly created. Thus, once Performance history for the first GPU is updated and Performance history for the second GPU task is created, the performance profiler 200 sets a total Cost for all GPU tasks (that is, Total GPU Cost).

As the foregoing Performance history update process is performed, Task Information 340 is also updated. That is, each time when CPU Cost and GPU Cost are updated, a current CPU Cost value and a current GPU Cost value in Task Information 340 are updated. Once a preset number of performance history update processes have been completed, the CPU Base variation and the GPU Base variation are updated with an average value of CPU state change values and an average value of GPU state change values included in each Performance history.

For example, if the CPU Base variation and the GPU Base variation are determined as an average value of 10 CPU state change values and an average value of 10 GPU state change values, respectively, an average value of 10 CPU Base variations and an average value of 10 GPU Base variations corresponding to Performance history updated 10 times are determined as a CPU Base variation and a GPU Base variation included in Task Information 340.

The above-described performance measurement process in the terminal may be summarized as follows:

(1) determining whether to conduct a performance test with respect to a CPU and a GPU based on whether a task state change, such as creation or deletion of a task or change of a value of interest, has occurred;

(2) if determining to conduct the performance test with respect to each of the CPU and the GPU, measuring a task execution duration of each of the CPU and the GPU and storing (or updating) Performance history by using the measurement results;

(3) if a new task has been created for the CPU or the GPU, storing Cost for the new task and measuring a task execution duration of each of the CPU and the GPU in a current state (that is, in a state where the new task and the existing task are executed at the same time);

(4) updating current CPU Cost, current GPU Cost, Total CPU Cost, and Total GPU Cost;

(5) updating a state change value for each of the CPU and GPU tasks by using the updated current CPU Cost, current GPU Cost, Total CPU Cost, and Total GPU Cost, and updating a CPU Base variation and a GPU Base variation based on the updated state change values; and (6) repeating (1) to (5) until a preset number of CPU state change values and a preset number of GPU state change values are obtained to finally determine the CPU Base variation and the GPU Base variation.

The above-described performance measuring method based on a task state change may consume a significant amount of time if the number of tasks increases, despite reducing overhead corresponding to measurement and storing of a task execution duration.

Considering such a problem, an embodiment of the present disclosure proposes a performance predicting method using a CPU Base variation and a GPU Base variation of Task Information. When this method is used, a performance measurement process is not necessary, minimizing overhead and saving a time corresponding to performance measurement.

CPU/GPU prediction Cost proposed in an embodiment of the present disclosure is determined using Equation 1.

$$\text{Prediction Cost} = \text{Base Cost} * (\text{Base Cost Variation with respect to Total Cost}) \quad \text{Equation 1}$$

In Equation 1, Prediction Cost indicates Prediction Cost for a CPU task or a GPU task, Base Cost indicates CPU Base Cost or GPU Base Cost, and a Base Cost variation with respect to Total Cost indicates a CPU Base variation or a GPU Base variation.

As can be seen in Equation 1, in an embodiment of the present disclosure, Cost for a CPU or GPU task is predicted based on Base Cost and a Base variation. The performance prediction process is performed if a CPU Base variation or a GPU Base variation included in Task Information is determined by Performance history updated a preset number of times.

The performance prediction process proposed in an embodiment of the present disclosure may include two cases: a case where a task is being executed and a case where a task resumes.

In the case where the task is being executed, the terminal determines whether a new task has been created. If a new task has been created, the terminal stores Cost for the new task and updates Total Cost for the existing task based on Cost for the new task. The terminal determines Prediction Cost for the existing task based on the updated Total Cost and a Base variation. In the case where the task resumes, the terminal determines the prediction Cost based on the stored Total Cost and Base variation.

A description will be made of an example of the performance prediction method according to an embodiment of the present disclosure.

Figure 4A:
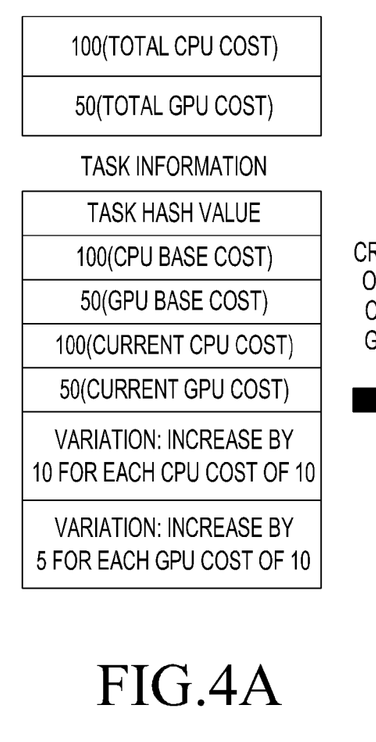
FIGS. 4A and 4B illustrate information stored in a database used for performance prediction for task scheduling in a terminal according to an embodiment of the present disclosure.
Figure 4B:
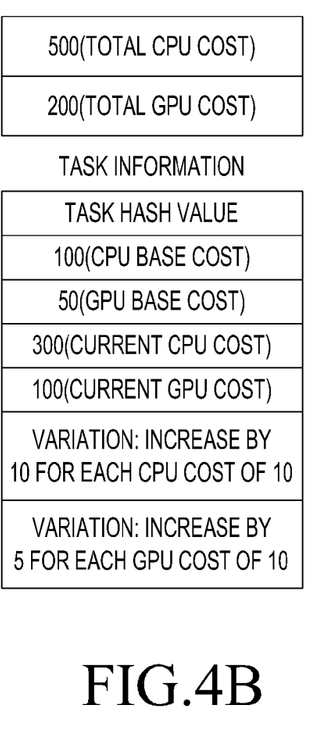

FIGS. 4A and 4B illustrate information stored in a database used for performance prediction for task scheduling in a terminal according to an embodiment of the present disclosure.

Referring to FIGS. 4A and 4B, if a second CPU task corresponding to Cost of 200 and a second GPU task corresponding to Cost of 100 are created in a state where information as illustrated in FIG. 4A (for example, referred to as 'first CPU and first GPU task information') is stored in the database, the terminal performs operations described below.

By using a CPU Base variation and a GPU Base variation corresponding to the first CPU task and the first GPU task, the terminal predicts current CPU Cost and current GPU Cost for the first CPU task and the first GPU task, respectively, corresponding to when the first CPU task and the first GPU task are performed simultaneously with the created second CPU task and the created second GPU task, respectively, as will be described in more detail below.

The terminal predicts current CPU Cost by using a CPU Base variation for the first CPU task and Cost for the created second CPU task (that is, Cost for the second CPU task measured during execution of the first CPU task). For example, the CPU Base variation for the first CPU task may increase by 10 for each CPU Cost of 10 and Cost for the second CPU task equals to 200, such that the terminal may predict that current CPU Cost will increase by 200 from 100 to 300 when the first CPU task is being executed simultaneously with the second CPU task (that is, during Cost of 200).

The terminal predicts current GPU Cost by using the GPU Base variation for the first GPU task and Cost for the created second GPU task. For example, the GPU Base variation for the first GPU task may increase by 5 for each GPU Cost of 10 and Cost for the second GPU task (that is, Cost for the second GPU task measured during execution of the first GPU task) equals to 100, such that the terminal may predict that the current GPU Cost will increase by 50 from 50 to 100 when the first GPU task is being executed simultaneously with the second GPU task (that is, during Cost of 100).

Based on the predicted current CPU Cost and current GPU Cost, Task Information is updated as illustrated in FIG. 4B. In addition, Total CPU Cost and Total GPU Cost are updated to 500 and 200 by summing updated current CPU Cost of 300 and Base Cost of 200 for the second CPU task and summing updated current GPU Cost of 100 and Base Cost of 100 for the second GPU task, respectively.

The foregoing process may be repeated if creation, deletion, or change of the CPU task or the GPU task has occurred, such that the terminal may reduce overhead through the performance prediction process and thus efficiently perform task scheduling.

A description will be made of performance measurement and prediction for task scheduling in a terminal according to an embodiment of the present disclosure.

Figure 5:
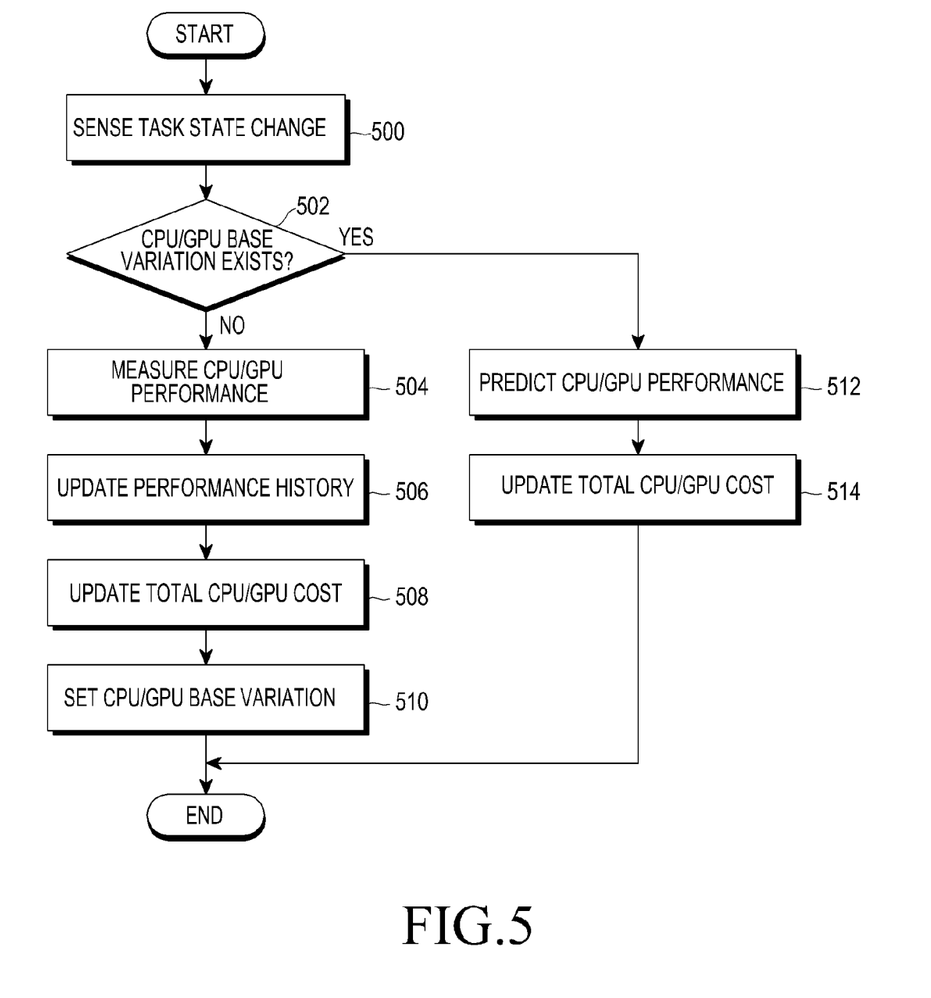
FIG. 5 is a flowchart illustrating performance measurement and prediction for task scheduling in a terminal according to an embodiment of the present disclosure.

FIG. 5 is a flowchart illustrating performance measurement and prediction for task scheduling in a terminal according to an embodiment of the present disclosure.

Referring to FIG. 5, the terminal senses a task state change in operation 500, and determines in operation 502 whether there is a CPU Base Cost Variation or a GPU Base Cost Variation which has been determined by Performance history updated a preset number of times.

If the CPU Base Cost Variation and the GPU Base Cost Variation do not exist, the terminal measures performance of a CPU and a GPU. That is, the terminal measures a task execution duration of each of a CPU task and a GPU task in operation 504 and updates Performance history to include the measured task execution duration of each of the CPU task and the GPU task in operation 506. The terminal updates Total CPU Cost and Total GPU Cost based on the updated performance history in operation 508. The terminal sets (updates) a CPU Base variation and a GPU Base variation by using the updated Total CPU Cost and total GPU Cost in operation 510.

Operations 504 through 510 are repeated until Performance history is updated a preset number of times. If Performance history is updated a preset number of times, the terminal performs performance prediction with respect to the CPU and the GPU with the method described in FIGS. 4A and 4B based on information included in Performance history.

If determining that the CPU Base Cost variation and the GPU Base Cost variation exist in operation 502, the terminal performs performance prediction with respect to the CPU and the GPU in operation 512. The terminal updates Total CPU Cost and Total GPU Cost based on the predicted Cost for each of the CPU and the GPU in operation 514.

After completing the process illustrated in FIG. 5, the terminal determines performance for each of the CPU and the GPU based on Total CPU Cost and Total GPU Cost and performs task scheduling based on the determined performance for each of the CPU and the GPU.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

The invention claimed is:

1. A method for performing task scheduling in a terminal comprising at least two cores having different types, the method comprising:
   determining whether a task state change has occurred corresponding to at least one core of the at least two cores;
   determining a variation in a first execution duration of each of multiple tasks, if the task state change has occurred, the first execution duration of each of the multiple tasks being a cost in a time dimension for executing the each of the multiple tasks by the at least two cores;
   predicting a second execution duration for each of the multiple tasks corresponding to the task state change by using an amount of the determined variation, if the first execution duration of each of multiple tasks; and
   performing the task scheduling with respect to the at least one core of the at least two cores based on the predicted second executed duration,
   wherein the determining of the variation of the first execution duration of each of the multiple tasks comprises determining the variation of the first execution duration of each of the multiple tasks, by using a third execution duration indicating an execution duration when each of the multiple tasks is executed alone and a fourth execution duration indicating an execution duration when the multiple tasks are executed at the same time.

2. The method of claim 1, wherein the determining of whether the task state change has occurred comprises:
   determining whether at least one of the multiple tasks has been changed;
   determining whether at least one of the multiple tasks has been deleted; or
   determining whether at least one task to be newly executed corresponding to the at least one core of the at least two cores has been created.

3. The method of claim 1, wherein the determining of the variation of the execution duration of each of the multiple tasks by using the third execution duration and the fourth execution duration comprises:

measuring the fourth execution duration a preset number of times;

measuring the fourth execution duration a preset number of times;

determining a difference between the second execution duration measured the preset number of times and the third execution duration to determine a preset number of differences; and determining the variation in the first execution duration of each of the multiple tasks by using an average value of the determined differences.

4. The method of claim 1, wherein the performing of the task scheduling comprises:

determining an execution duration for all tasks being executed corresponding to the at least one core of the at least two cores, based on the predicted second execution duration; and performing the task scheduling with respect to the at least one core of the at least two cores, taking the execution duration for all the tasks into account.

5. The method of claim 1, wherein the determining of the variation in the first execution duration of each of the multiple tasks comprises:

determining the variation in the execution duration of each of the multiple tasks based on previously stored task information, wherein the task information comprises an identifier for each of the multiple tasks, a fifth execution duration indicating an execution duration corresponding to when each of the multiple tasks is executed alone, a sixth execution duration indicating an execution duration for each of the multiple tasks measured when the task state change has occurred, and information about a variation in the fifth execution duration.

6. The method of claim 5, wherein the information about the variation of the fifth execution duration is determined based on an average value of state change values included in multiple performance history information and wherein the state change value is determined using a difference between a seventh execution duration of each of the multiple tasks measured a preset number of times when the task state change occurs, and the fifth execution duration.

7. A terminal comprising at least two cores having different types, the terminal comprising:

a processor configured to:

determine whether a task state change has occurred corresponding to at least one core of the at least two cores;

determine a variation in a first execution duration of each of multiple tasks, if the task state change has occurred, the first execution duration of each of the multiple tasks being a cost in a time dimension for executing the each of the multiple tasks by the at least two cores;

predict a second execution duration for each of the multiple tasks corresponding to the task state change, by using an amount of the determined variation, if the first execution duration of each of multiple tasks being executed for the at least one core varies; and performing the task scheduling with respect to the at least one core of the at least two cores based on the predicted second executed duration, wherein the determining of the variation of the first execution duration of each of the multiple tasks comprises determining the variation of the first execution duration of each of the multiple tasks, by using a third execution duration indicating an execution duration when each of the multiple tasks is executed alone and a fourth execution duration indicating an execution duration when the multiple tasks are executed at the same time.

8. The terminal of claim 7, wherein the processor further configured to:

determine whether at least one of the multiple tasks has been changed;

determine whether at least one of the multiple tasks has been deleted; or determine whether at least one task to be newly executed corresponding to the at least one core of the at least two cores has been created.

9. The terminal of claim 7, wherein the processor further configured to:

determine a difference between the fourth execution duration measured a preset number of times and the first execution duration to determine a preset number of differences, and determine the variation of the first execution duration of each of the multiple tasks by using an average value of the determined differences.

10. The terminal of claim 7, wherein the processor further configured to:

determine an execution duration for all tasks being executed corresponding to the at least one core of the at least two cores, based on the predicted second execution duration; and perform the task scheduling with respect to the at least one core of the at least two cores, taking the execution duration for all the tasks into account.

11. The terminal of claim 7, further comprising a database configured to store task information comprising an identifier for each of the multiple tasks, a fifth execution duration indicating an execution duration corresponding to when each of the multiple tasks is executed alone, a sixth execution duration indicating an execution duration for each of the multiple tasks measured when the task state change has occurred, and information about a variation in the fifth execution duration, wherein the processor is further configured to determine the variation of the first execution of each of the multiple tasks based on the task information.

12. The terminal of claim 11, wherein the information about the variation of the fifth execution duration is determined based on an average value of state change values included in multiple performance history information, and wherein the state change value is determined using a difference between a seventh execution duration of each of the multiple tasks measured a preset number of times when the task state change occurs, and the fifth execution duration.

13. A non-transitory computer-readable storage medium storing instructions thereon executed by at least one processor to perform a method of task scheduling in a terminal comprising at least two cores having different types, the method comprising:

determining whether a task state change has occurred corresponding to at least one core of the at least two cores;

determining a variation in a first execution duration of each of multiple tasks, if the task state change has occurred, the first execution duration of each of the multiple tasks being a cost in a time dimension for executing the each of the multiple tasks by the at least two cores;

predicting a second execution duration for each of the multiple tasks corresponding to the task state change by using an amount of the determined variation, if the first execution duration of each of multiple tasks; and performing the task scheduling with respect to the at least one core of the at least two cores based on the predicted second executed duration, wherein the determining of the variation of the first execution duration of each of the multiple tasks comprises determining the variation of the first execution duration of each of the multiple tasks, by using a third execution duration indicating an execution duration when each of the multiple tasks is executed alone and a fourth execution duration indicating an execution duration when the multiple tasks are executed at the same time.

* * * * *